UNITED STATES PATENT OFFICE.

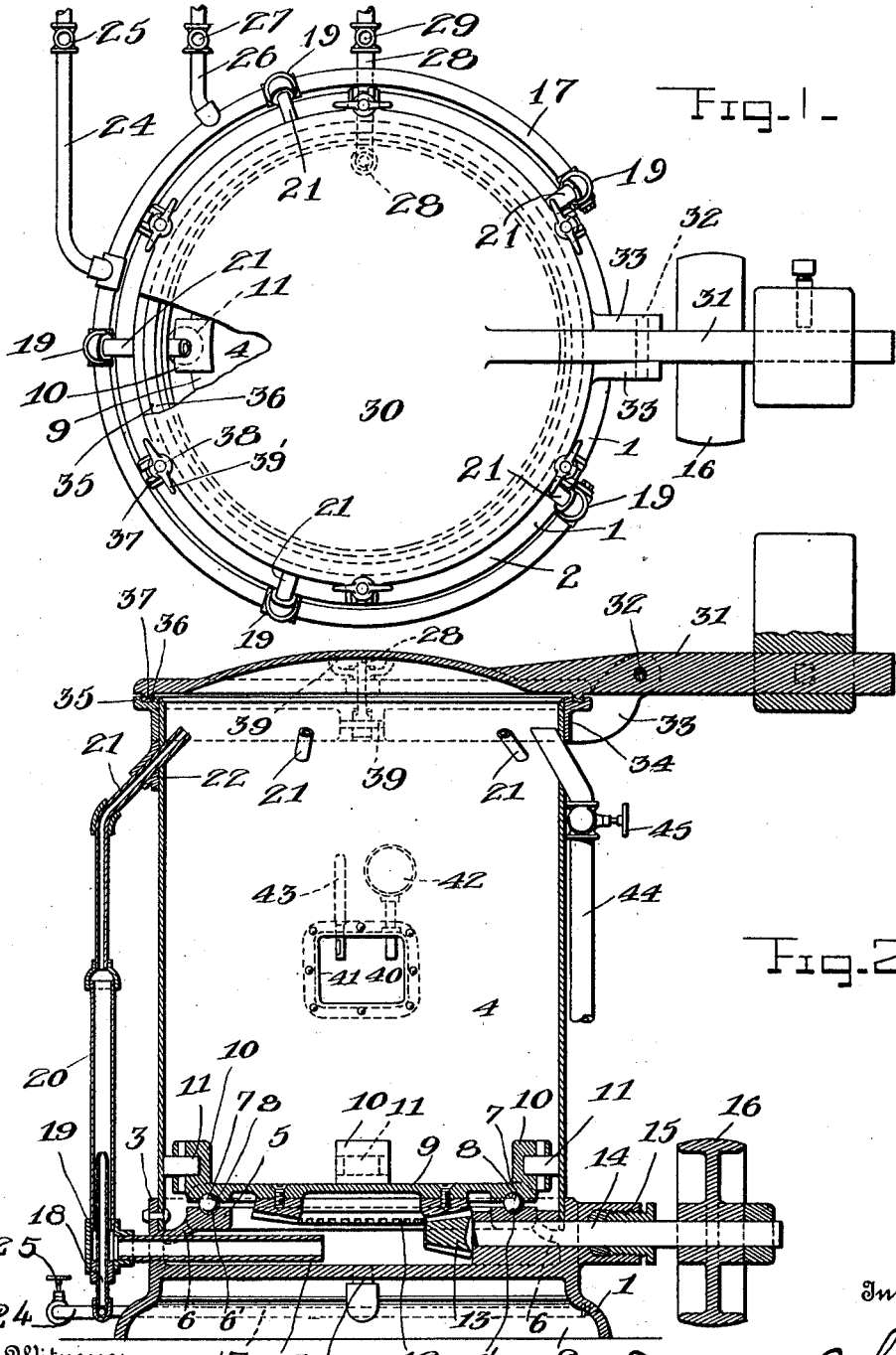

EDWARD D. SCHMITT, OF BALTIMORE, MARYLAND, ASSIGNOR, BY DIRECT AND MESNE ASSIGNMENTS, TO THE PURE FOOD PROCESS COMPANY, OF BALTIMORE, MARYLAND, A CORPORATION OF MARYLAND.

VESSEL FOR COOKING FOOD PRODUCTS.

1,003,952.  Specification of Letters Patent.  Patented Sept. 19, 1911.

Application filed November 18, 1909. Serial No. 528,783.

*To all whom it may concern:*

Be it known that I, EDWARD D. SCHMITT, a citizen of the United States, residing in Baltimore city and State of Maryland, have invented certain new and useful Improvements in Vessels for Cooking Food Products, of which the following is a specification.

This invention relates to improvements in vessels for cooking food products and more particularly for cooking or processing food products put up in hermetically sealed jars or receptacles.

The object of the invention is to provide a construction wherein the water and steam circulation will be uniform, so that the receptacles containing the food products may be uniformly subjected to the same degree of heat in cooking or processing, or to the same degree of temperature in cooling the same, according to the exigencies of the process.

My invention contemplates the provision of a vessel in which the receptacles will be kept constantly in motion and the water and steam, or both, will be uniformly circulated among such receptacles.

The apparatus is more particularly intended to cook, process or cool, as may be required, food products put up in glass jars and sealed with a cap or closure such as that shown in my Patent Number 933,347, September 7, 1909, although the apparatus may be used for cooking or processing food products or beverages put up in receptacles other than those indicated.

In the drawings illustrating the invention: Figure 1 is a top plan view of the vessel; and Fig. 2 is a central section of the same.

The numeral 1 designates the base of the vessel formed of cast metal, having flaring lower portion 2 and a flange 3 to which is bolted or riveted, the cylindrical body 4. The base is provided with an annular support 5 provided with a plurality of integral webs 6 which are also integral with the base casting. This support is in the form of a ring, and its upper edge is provided with an annular groove 6' for the reception of balls 7 which fit also into an annular groove 8 of the rotatable table 9. The table 9 is provided with a number of upwardly projecting studs 10 which carry anti-friction rollers 11 adapted to lightly engage the inner wall of the body 4, to steady the table in its movement. Bolted to the table 9 is a beveled gear 12 which meshes with a bevel pinion 13 carried upon the shaft 14 mounted in suitable bearings in the base 2. The shaft passes through a suitably packed bearing or stuffing box 15 and carries at its outer end a driving pulley 16, through which power may be imparted from any suitable source not shown, to slowly revolve the table, through the medium of the gear just mentioned.

Partly surrounding the vessel is a feed pipe 17, having connected therewith, at suitable intervals, a plurality of injectors 18, only one shown, which pass through a number of suitably packed T-connections 19, to the upper end of which are connected a number of vertical supply pipes 20 that extend almost to the top of the vessel, where they are provided with nozzles 21 which project through suitably packed openings 22, into the vessel. Communicating with the pipes 20 around nozzles 18 are a number of horizontal eduction pipes 23, only one shown, which extend radially into the vessel below the revolving table 9. Suitably connected with the pipe 17 is a water inlet pipe 24, controlled by a valve 25 and at another point in the pipe 17, I provide a steam pipe 26 controlled by the valve 27 and I provide the vessel with a suitable drain pipe 28 controlled by a valve 29.

The vessel is provided with a top or cover 30 having a laterally extended weighted arm 31 pivoted at 32 between two ears 33, integral with the cast metal ring 34 which surrounds the upper edge of the vessel. This ring is provided with an annular groove 35 in which is seated a gasket or packing 36 which is engaged by an annular rib 37 on the under face of the cover. The cover is further provided with a plurality of yokes 37. These yokes receive the threaded rods 38 which are pivoted between ears 39 on the ring 34. Each rod carries a nut 39' which bears upon the upper face of the yokes, for the obvious purpose of securely holding the cover in steam-tight contact with the vessel, which is necessary in an apparatus of this sort for the reason that very considerable pressure is generated in the vessel during the cooking process.

I provide at one side of the body, a flanged box 40 which is securely bolted to the body as shown. This box is in communication with the vessel through the opening 41, and let into the top of the box is a pressure gage 42 and a thermometer 43 for the obvious purpose of determining the pressure within the vessel at all times, and the temperature of the water both in the cooking and cooling operation.

The numeral 44 designates an overflow pipe, through which the excess of water in filling the vessel is drawn off. This pipe is provided with a valve 45, closed in the cooking operation and opened for the overflow when cold water is run into the vessel in the cooling operation.

In operation, the receptacles containing the food-product are preferably placed in suitable crates, (not shown) and the crated receptacles placed, spaced apart, in a single crate, (not shown), as the exigencies of the case may require, and the whole placed upon the revolving table within the vessel, which is then filled with water, by means of pipe 24, until it reaches the overflow-pipe, when the flow is cut off by means of valve 25. Valve 45 in the overflow-pipe is then closed and steam introduced into pipe 17, and heating the water therein and in the several pipes 20 passes into the vessel, through the nozzles 21, heating the water therein. The introduction of the steam creates a circulation which draws the water at the bottom of the vessel, where it is coolest, through the several eduction-pipes into the pipes 20, where it becomes more highly heated by the inflowing steam, causing a continuous circulation which is automatic in its action, thus dispensing with the pumps rendered necessary in other machines of like character. During the circulation of the water, the highly heated water, at the top of the vessel, is drawn down upon and around the receptacles as they are being slowly revolved within the vessel, so that all parts of the receptacles are subjected to the action of the heated water. After the product has been sufficiently cooked, the steam is cut off and the filled receptacles allowed to slowly cool a proper time when valves 45 and 25 are opened and water allowed to flow through the vessel until the thermometer indicates the proper temperature at which the receptacles containing the cooked product should be taken out.

By automatically creating a continuous circulation of hot water through the vessel, by means of the eduction pipes, injector-pipes 20 and nozzle 21, a great saving of time, labor and expense is effected, and better results obtained than when a pump is employed to create and maintain the circulation.

Having thus fully described my invention, what I claim is:

1. In an apparatus for cooking food-products, the combination of a suitable vessel provided with a rotatable bottle or jar-support, a feed-pipe, means connected with the feed-pipe for introducing a heating-medium into the upper part of the vessel, and a pipe situated in the lower part of the vessel and communicating with the means for introducing the heating-medium.

2. In an apparatus for cooking food-products, the combination of a suitable vessel provided with a rotatable bottle or jar-support, a supply-pipe provided with an injector for introducing a heating medium into the upper part of the vessel, a valved overflow-pipe, and means located in the lower part of said vessel, whereby a circulation is maintained through the vessel from top to bottom thereof.

3. In an apparatus for cooking food-products, the combination of a suitable vessel provided with a rotatable bottle or jar-support, a feed-pipe, a supply-pipe, an injector connecting the feed-pipe with the supply-pipe, whereby a heating-medium is introduced into the upper part of the vessel, and a pipe situated in the lower part of the vessel and communicating with the supply-pipe.

4. In an apparatus for cooking food-products, the combination of a suitable vessel provided with a rotatable bottle or jar-support, a plurality of supply-pipes, each provided with an injector, for introducing a heating medium into the upper part of said vessel, a valved overflow-pipe, and an eduction-pipe for each supply-pipe in communication with the vessel, whereby a circulation is maintained through the vessel from top to bottom thereof.

5. In an apparatus for cooking food-products, the combination of a suitable vessel provided with a rotatable bottle or jar-support, a feed-pipe, a supply-pipe, an injector connected with the feed and supply-pipes, whereby a heating-medium is introduced into the upper part of the vessel, an overflow pipe, and means situated in the lower part of the vessel whereby a circulation is automatically created and maintained through the vessel.

6. In an apparatus for cooking food-products, the combination of a suitable vessel provided with a rotatable bottle or jar-support, a feed-pipe common to both water and steam, a plurality of supply-pipes, an injector for each supply-pipe connected with the feed-pipe, an overflow-pipe, eduction pipes, situated in the lower part of the vessel in communication with the supply-pipes and the vessel, whereby a circulation is automatically created and maintained through the vessel.

7. An apparatus for cooking food-products, comprising a suitable vessel, a feed-pipe partially surrounding the vessel, a valved water-supply-pipe in communication with the feed-pipe, a valved steam-supply-pipe in communication with said feed-pipe, a number of supply-pipes for introducing a heating or a cooling-medium into the upper part of the vessel, said supply-pipes being spaced apart at suitable intervals from one another, whereby the heating or cooling may be accomplished uniformly throughout the entire vessel, injectors in communication with the feed and supply-pipes, and eduction-pipes situated in the lower part of the vessel and in communication with the supply-pipes, whereby a circulation is automatically created and maintained through the vessel.

In testimony whereof I affix my signature in presence of two witnesses.

EDWARD D. SCHMITT.

Witnesses:
FRANCIS S. MAGUIRE,
FRANK G. BRERETON.

Copies of this patent may be obtained for five cents each, by addressing the "Commissioner of Patents, Washington, D. C."